United States Patent

Schaak

(10) Patent No.: US 12,366,349 B1
(45) Date of Patent: Jul. 22, 2025

(54) TABLE LAMP HAVING USB CHARGING PORTS AND WIRELESS CHARGING MODULE

(71) Applicant: Lee Schaak, Dix Hills, NY (US)

(72) Inventor: Lee Schaak, Dix Hills, NY (US)

(73) Assignee: Adesso Inc., New York, NY (US)

( * ) Notice: Subject to any disclaimer, the term of this patent is extended or adjusted under 35 U.S.C. 154(b) by 0 days.

(21) Appl. No.: 18/938,637

(22) Filed: Nov. 6, 2024

(51) Int. Cl.
| | |
|---|---|
| *F21V 23/02* | (2006.01) |
| *F21S 6/00* | (2006.01) |
| *F21V 23/06* | (2006.01) |
| *H02J 7/00* | (2006.01) |
| *H02J 50/00* | (2016.01) |
| *H02J 50/10* | (2016.01) |

(52) U.S. Cl.
CPC ............ *F21V 23/023* (2013.01); *F21S 6/003* (2013.01); *F21V 23/06* (2013.01); *H02J 7/0042* (2013.01); *H02J 50/005* (2020.01); *H02J 50/10* (2016.02); *H02J 2207/30* (2020.01)

(58) Field of Classification Search
CPC ........ F21V 23/06; F21V 23/023; F21S 6/006; F21S 6/003; F21S 6/002; H02J 50/11; H02J 2207/30; H02J 50/005; H02J 7/0042

See application file for complete search history.

(56) References Cited

U.S. PATENT DOCUMENTS

| | | | |
|---|---|---|---|
| 6,874,907 B2 | 4/2005 | Liao | |
| 7,736,033 B2 | 6/2010 | Patel | |
| 7,791,312 B2* | 9/2010 | Kook | H02J 50/80 320/108 |
| 7,897,277 B2 | 3/2011 | Meyer et al. | |
| 8,545,039 B2 | 10/2013 | Patel | |
| 8,899,797 B2* | 12/2014 | Schaak | B42D 17/00 362/410 |
| 9,109,791 B2* | 8/2015 | Lin | F21S 6/003 |
| 10,184,649 B2 | 1/2019 | Chien | |
| 10,247,402 B2 | 4/2019 | Chen | |
| 10,260,735 B2 | 4/2019 | Chien | |
| 10,337,705 B2* | 7/2019 | Rolf | H04R 1/028 |
| 10,476,286 B2 | 11/2019 | Chien | |
| 10,574,069 B2 | 2/2020 | Chien | |
| 10,601,973 B1* | 3/2020 | Raghunathan | H01R 27/00 |
| 10,873,191 B2 | 12/2020 | Chien | |
| 11,114,865 B2 | 9/2021 | Chien | |
| 11,342,777 B2* | 5/2022 | Partovi | H01F 38/14 |
| 11,456,604 B2* | 9/2022 | Hwang | H02J 7/0044 |
| 11,572,989 B2* | 2/2023 | Shen | F21V 23/06 |
| 11,759,006 B2* | 9/2023 | O'Brien | A47B 21/06 211/10 |
| 11,916,426 B2* | 2/2024 | Oner | H02J 7/00714 |
| 12,188,640 B2* | 1/2025 | Dai | F21V 17/12 |
| 2003/0193795 A1 | 10/2003 | Brown | |
| 2005/0225287 A1 | 10/2005 | Yang | |
| 2009/0010462 A1* | 1/2009 | Ekchian | H02J 7/0029 320/137 |
| 2012/0113645 A1 | 5/2012 | Liao et al. | |
| 2018/0138645 A1 | 5/2018 | Chen | |
| 2022/0267205 A1 | 8/2022 | Chien et al. | |
| 2024/0077753 A1* | 3/2024 | Isaacs | H02J 7/00714 |

\* cited by examiner

*Primary Examiner* — Ismael Negron

(74) *Attorney, Agent, or Firm* — King & Partners, PLC

(57) ABSTRACT

A table lamp that includes a base, at least one light source connected to the base, at least one of USB Type-A or Type-C ports, a wireless charging module, and circuits for control, rectification and voltage regulations.

10 Claims, 16 Drawing Sheets

TABLE LAMP HAVING USB CHARGING PORTS AND WIRELESS CHARGING MODULE

COPYRIGHT NOTICE

This application includes material that is subject to copyright protection. The copyright owner has no objection to the facsimile reproduction by anyone of the patent disclosure, as it appears in the United States Patent and Trademark Office files or records, but otherwise reserves all copyright rights whatsoever.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates to multi-functional table lamps, specifically table lamps equipped with integrated charging modules that provide wired and/or wireless charging capabilities. These lamps ensure safe, consistent direct current (DC) output for connected devices, incorporating overcharge protection to prevent battery damage.

2. Background of the Invention

Existing table lamps with charging capabilities often suffer from limitations in charging safety and output consistency, particularly with integrated wireless and USB ports. Consumers increasingly demand versatile charging options that safeguard their devices. The invention addresses these issues, providing both USB and wireless charging modules with enhanced protective features, including voltage regulation, rectification, and reliable overcharge protection.

3. Background Art

Table lamps having various integrated components have been known in the art for years, and are the subject of a plurality of patents including, for example: United States Patent Publication Number 2018/0138645 entitled "Standard Lamp with USB Interface," United States Patent Publication Number 2003/0193795 entitled "Illumination Device," U.S. Pat. No. 11,114,865 entitled "Desktop Item with LED Means and USB Charging," U.S. Pat. No. 10,574,069 entitled "Quickly Charger for Desktop Power Station or Lighting Device," U.S. Pat. No. 10,476,286 entitled "Desktop Item with USB Charging Ports," U.S. Pat. No. 10,260,735 entitled "Quickly Charger with USB Charging Ports for Lighted Cosmetic Mirror Device," U.S. Pat. No. 10,247,402 entitled "Lamp Device," U.S. Pat. No. 10,184,649 entitled "Quick Charger with USB Charging Ports for Lighting Device," U.S. Pat. No. 8,545,039 entitled "Lamp Base with Upgradeable Recharging Port and Method," and United States U.S. Pat. No. 7,736,033 entitled "Lamp Base with Electrical Device Recharging Receptacle and Method"—all of which are hereby incorporated herein by reference in their entirety including all references cited therein.

US 2018/0138645—Standard Lamp with USB Interface

This patent describes a standard lamp with an integrated USB interface within its stand. A USB socket module is housed in a cartridge separated from the circuit board, connected by cables. This modular approach not only optimizes the aesthetics but also provides flexibility in USB port placement. The compact design allows easy integration of the USB interface, providing convenience for charging devices while maintaining the lamp's visual appeal.

US 2003/0193795—Illumination Device

This illumination device features a base, a flexible neck, and a slim illumination panel that emits diffuse light, making it suitable for use as a book light or task light. The panel is as thin as a credit card, enhancing portability and producing a soft, uniform light. This compact design offers focused illumination, ideal for reading or meticulous tasks without lighting an entire area.

U.S. Pat. No. 11,114,865—Desktop Item with LED Means and USB Charging

This device combines LED lighting with USB charging modules to create a multifunctional desktop accessory. The USB units are designed strictly for power, excluding data transfer, which prioritizes safety and enhances the efficiency of charging various devices like smartphones. This integration of lighting and power capabilities is ideal for modern workstations requiring easy device charging without additional clutter.

U.S. Pat. No. 10,574,069—Quickly Charger for Desktop Power Station or Lighting Device This patent covers a USB charging station for desktops, integrating multiple USB hubs and AC outlets. Capable of supplying both AC and DC power, the device is designed to support high-power devices such as laptops and smartphones. It includes protective features against overheating and supports additional modules, making it a versatile power source for home or office environments.

U.S. Pat. No. 10,476,286—Desktop Item with USB Charging Ports

This patent introduces a desktop item equipped with USB charging ports, specifically designed for high-capacity, fast charging. It supplies DC power to external devices such as tablets or phones but restricts data transfer for improved safety. This compact yet powerful charging station is intended to keep devices charged efficiently at any workspace.

U.S. Pat. No. 10,260,735—Quickly Charger with USB Charging Ports for Lighted Cosmetic Mirror Device This invention brings USB charging to lighted cosmetic mirrors. The design includes high-amperage USB ports capable of fast charging while minimizing overheating risks. The mirror also includes AC outlets, expanding its versatility, making it an ideal choice for personal grooming areas where multiple devices may need power.

U.S. Pat. No. 10,247,402—Lamp Device

The lamp device includes a USB socket module, separated from the main circuit board and linked via cables, allowing for flexible placement of the USB interface. This design optimizes both aesthetics and functionality, providing a sleek charging solution integrated within the lamp's base.

U.S. Pat. No. 10,184,649—Quickly Charger with USB Charging Ports for Lighting Device This patent describes a lighting device with multiple USB charging ports and conversion circuits to support fast charging. It is particularly suitable for work or study environments where lighting and charging of multiple devices are essential. The high-power USB ports allow rapid charging, adding functionality to standard lighting setups.

U.S. Pat. No. 8,545,039—Lamp Base with Upgradeable Recharging Port and Method

This lamp base innovation features an adaptable recharging port, allowing upgrades to support new charging standards. The port can accommodate various adapters, such as USB plugs, and provides flexibility in power conversion. The replaceable design ensures compatibility with a wide range of devices, keeping the lamp relevant despite advancing technology.

U.S. Pat. No. 7,736,033—Lamp Base with Electrical Device Recharging Receptacle and Method This patent introduces a lamp base with a built-in recharging receptacle, configured as a cigarette lighter-style socket. The socket converts household voltage to automotive voltage, enabling easy charging of portable devices. This early innovation brings added utility to lamp bases, allowing them to serve as a recharging station for electronic devices.

While the above-identified patents and publications do appear to disclose various table lamps, their configurations remain non-desirous and/or problematic inasmuch as, among other things, none of the above-identified lamps ensure safe, consistent direct current (DC) output for connected devices, incorporating overcharge protection to prevent battery damage.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to an advanced table lamp that seamlessly integrates both lighting and device-charging functionality, providing users with a versatile solution for everyday use in homes, offices, and commercial settings. The lamp is designed with a dual-purpose approach, enabling it to serve as both a functional lighting source and a reliable, efficient charging station for various electronic devices. This invention addresses the increasing demand for convenient charging solutions within familiar household items, offering users a streamlined, space-saving alternative to separate chargers and adapters.

The lamp base is constructed to incorporate several charging components, including multiple USB ports and an optional wireless charging module, all while maintaining a sleek, aesthetically pleasing design. The charging system is engineered with advanced power management features to ensure a stable DC output, which is crucial for safe and efficient device charging. Important elements include rectification, voltage regulation, and comprehensive safety mechanisms, each of which is tailored to meet the needs of modern devices and user safety.

Integrated USB and Wireless Charging Modules

In one embodiment of the present invention, the lamp features multiple USB charging ports, with at least one USB Type-A port and one USB Type-C port, allowing users to charge a range of devices directly from the lamp base. The Type-C port supports fast-charging protocols, catering to devices with higher power requirements, such as tablets and laptops. The optional wireless charging module, based on Qi-standard inductive charging technology, provides a convenient, cable-free charging option compatible with a wide range of smartphones and wearables. This combination of wired and wireless charging modules makes the invention suitable for households with multiple device types and charging needs.

The lamp's USB and wireless charging features are housed within the base, allowing easy access and user-friendly operation. This design keeps the lamp compact and clutter-free, making it ideal for bedside tables, desks, and other areas where space and convenience are paramount.

Consistent and Safe DC Output for Connected Devices

Another important feature of the invention is its ability to deliver a consistent, safe DC output, ensuring that connected devices receive the appropriate power without fluctuations that could lead to device damage or inefficient charging. The charging modules incorporate a rectification circuit, which converts incoming AC power from the lamp's main power source into a steady DC output. This rectification process is essential for stabilizing the current, especially when charging sensitive electronic devices that require precise power levels for safe operation.

Moreover, the system includes a voltage regulation circuit designed to maintain consistent voltage levels regardless of changes in input power or load demand. This regulation minimizes the risk of overvoltage, which can cause device batteries to overheat, deteriorate, or even malfunction. By offering a stable DC output, the invention ensures safe, efficient charging across various device types, enhancing overall reliability and user confidence in the product.

Advanced Safety Mechanisms for Overcharge and Thermal Protection

The charging system of the present invention is preferably equipped with sophisticated safety features that protect both the charging circuits and the connected devices. A key safety mechanism is the overcharge protection system, which automatically monitors the charge level of each connected device. Once a device's battery reaches full capacity, the system halts the charging process to prevent overcharging, which can degrade battery life and lead to potential safety risks. This overcharge protection not only enhances device longevity but also ensures user safety, particularly when devices are left charging unattended.

In addition to overcharge protection, the lamp includes thermal management features that safeguard against overheating. The charging modules are equipped with temperature sensors that monitor internal temperatures during operation. If an unsafe temperature threshold is reached, the system will automatically reduce or stop power output to allow for cooling, preventing damage to the lamp, charging circuitry, and connected devices. This thermal protection makes the lamp suitable for extended use, offering peace of mind and reducing potential hazards associated with overheating.

Rectification and Voltage Regulation for Power Stability

To further enhance power stability and device safety, the invention includes both rectification and voltage regulation circuits within each charging module. Rectification converts the alternating current (AC) from the main power source into a direct current (DC), which is essential for reliable charging of electronic devices. Voltage regulation then adjusts the rectified DC output to maintain a consistent voltage, accommodating a range of input voltages from standard outlets while ensuring the appropriate power level reaches the connected devices.

The rectification and voltage regulation combination is particularly valuable in environments where power fluctuations are common, as it protects sensitive electronics from damage due to inconsistent power supply. By maintaining a stable DC output, the invention supports high-efficiency charging and enhances device safety, even in settings with varying power quality.

User-Friendly and Aesthetic Design

The design of the table lamp is intended to provide a seamless integration of lighting and charging functions without sacrificing style or user convenience. The lamp's charging ports and wireless charging pad are discreetly integrated into the base, preserving the aesthetic appeal of the lamp and making it an attractive addition to various interior spaces. Users can easily access and use the charging features without needing to handle multiple charging adapters or cables, making it a practical solution for homes, offices, hotels, and other environments.

Furthermore, the lamp's base is engineered to provide stability, ensuring that both the lighting and charging functions remain reliable during use. The wireless charging pad is positioned in an easily accessible area, allowing users to simply place their devices on the base for immediate charging without complex alignment or setup.

Technical Advantages and Applications

This invention combines essential lighting with advanced charging technology, addressing consumer needs for safety, reliability, and convenience. By integrating rectification, voltage regulation, and comprehensive safety mechanisms, the lamp provides a consistent, safe DC output suitable for a wide range of electronic devices. The table lamp is particularly valuable for users who need a multi-functional product that simplifies charging and provides safe, efficient power management.

Ideal applications include home and office environments where users frequently need to charge devices, as well as commercial settings like hotels or co-working spaces, where convenient, multi-functional furniture can enhance user experience.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1A:
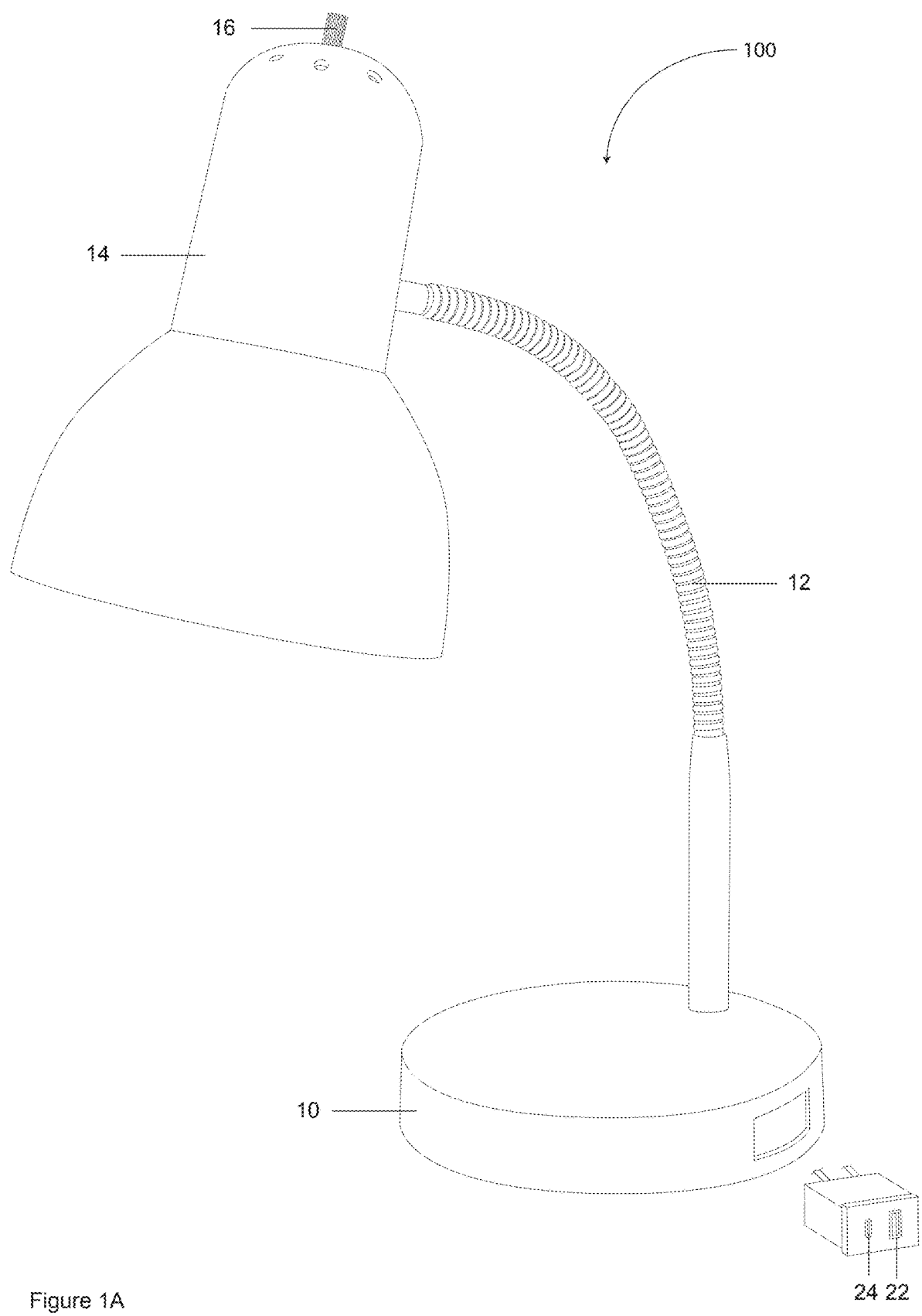
Figure 1B:
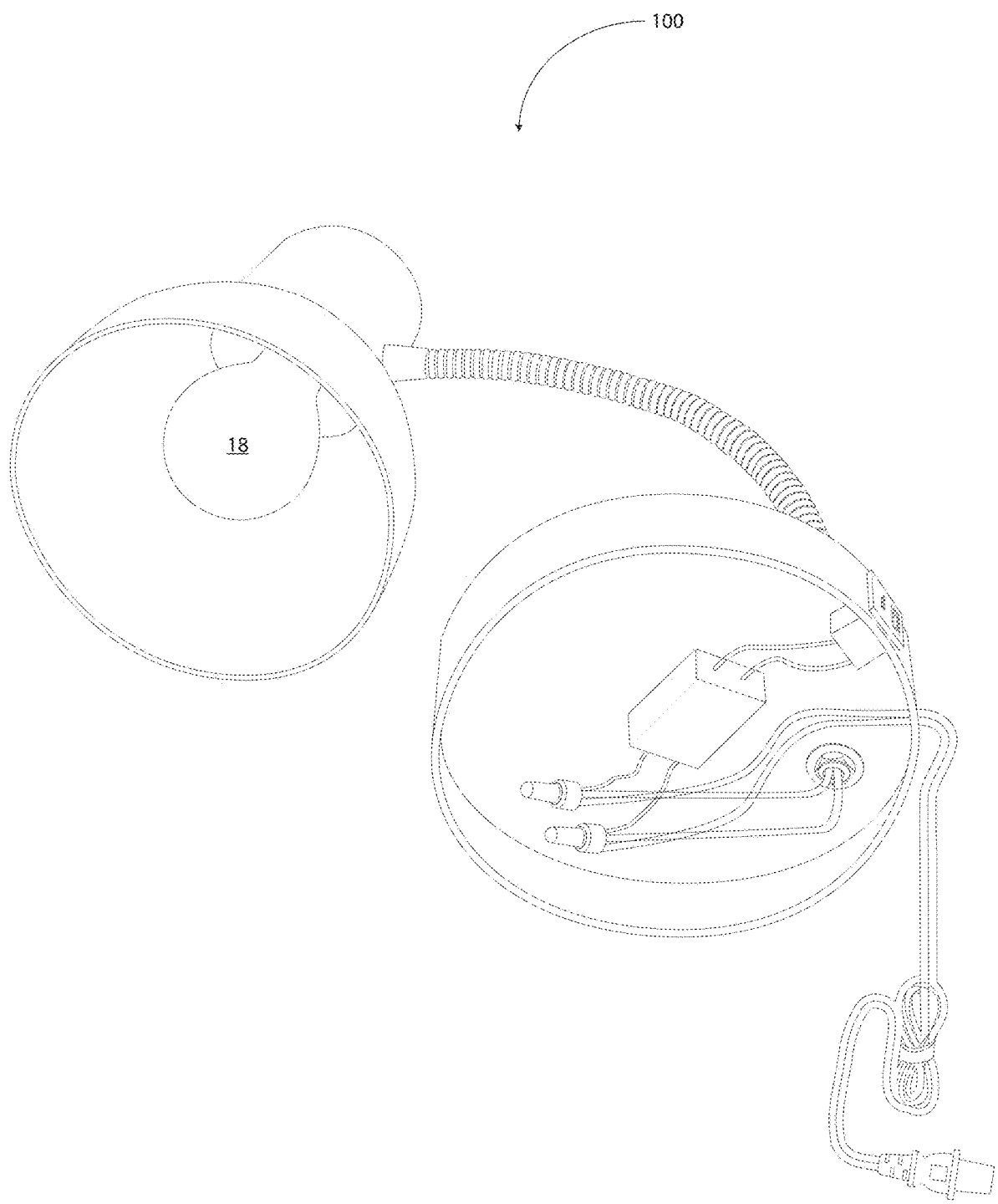
Figure 1C:
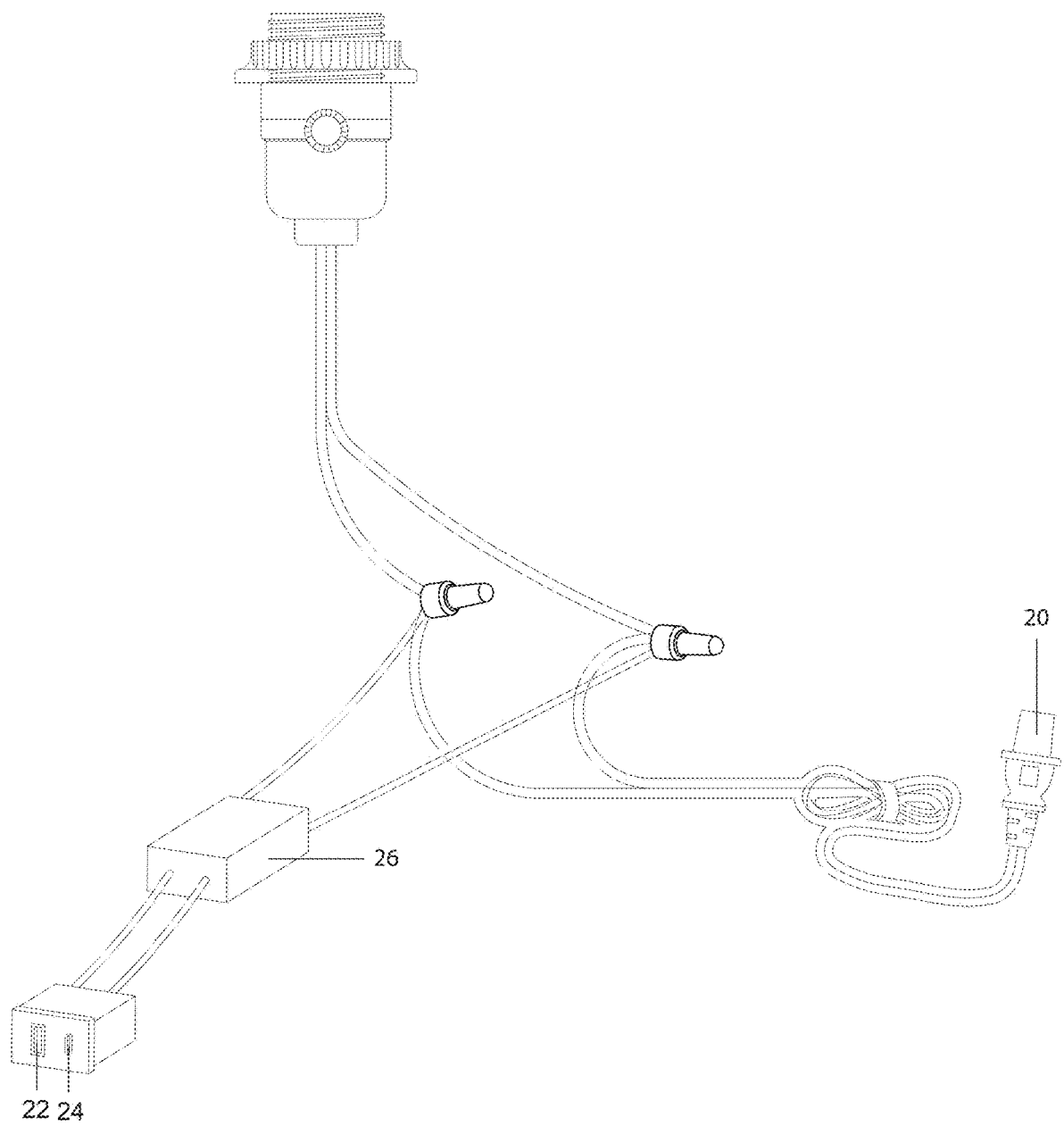
Figure 2A:
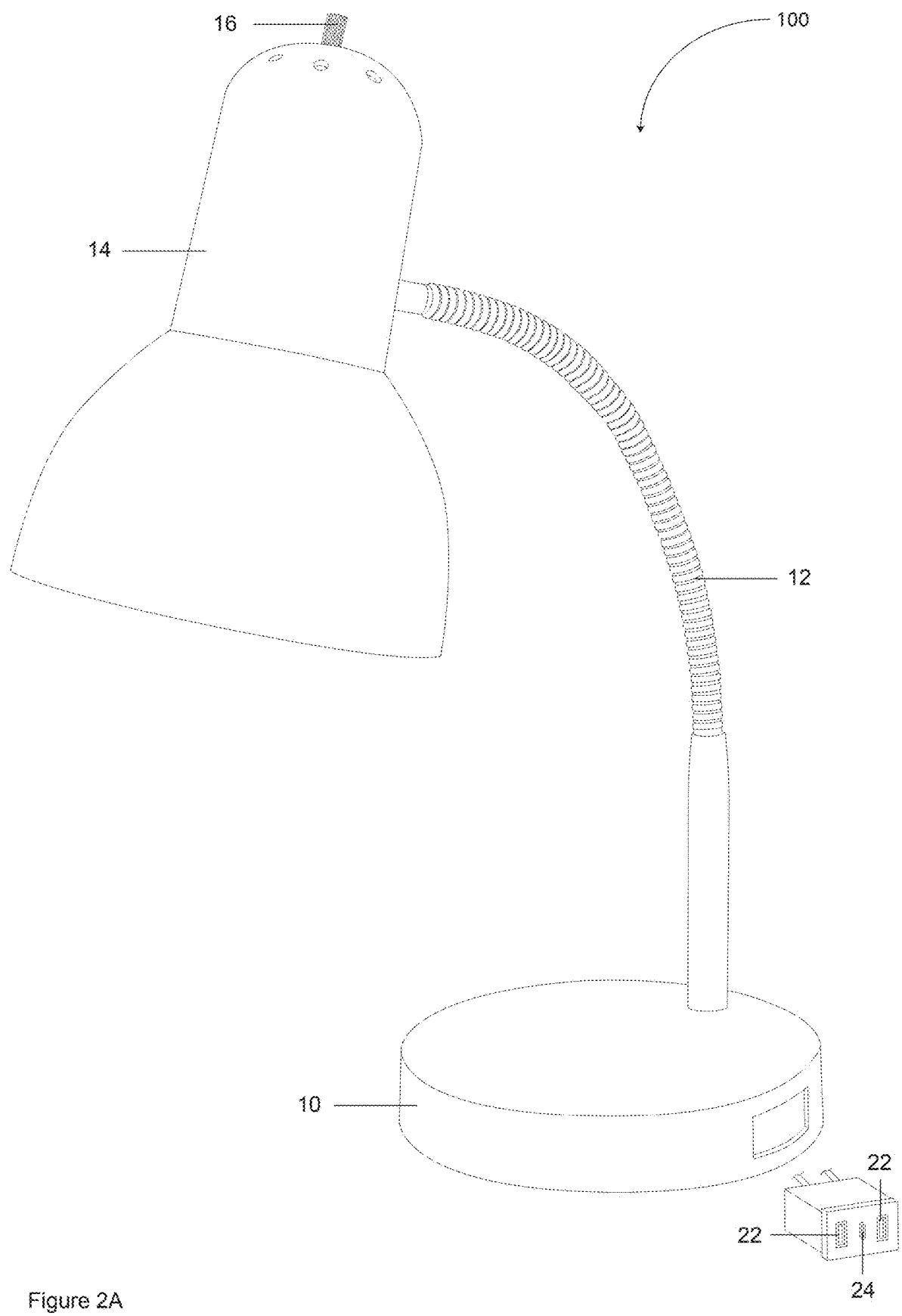
Figure 2B:
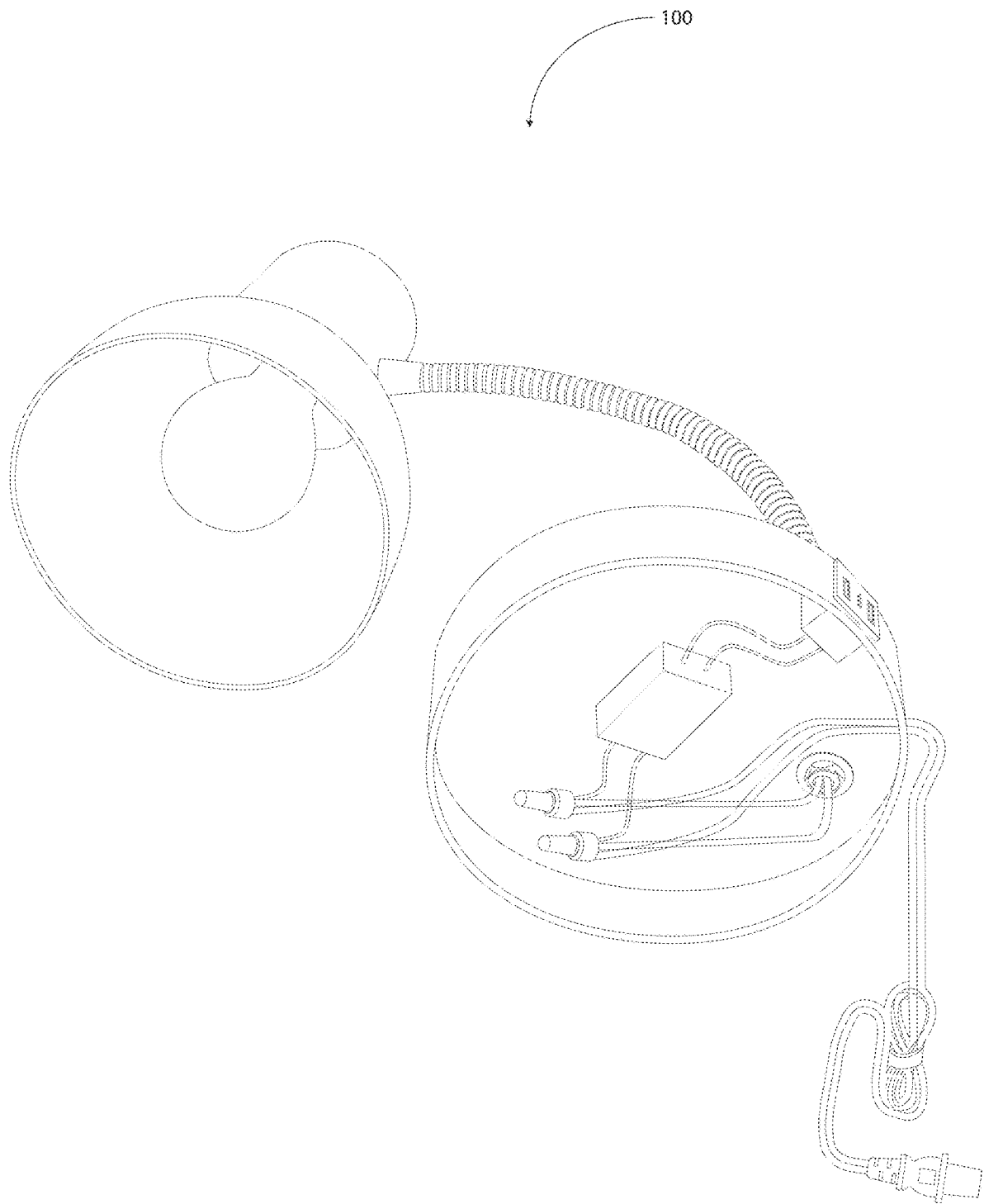
Figure 2C:
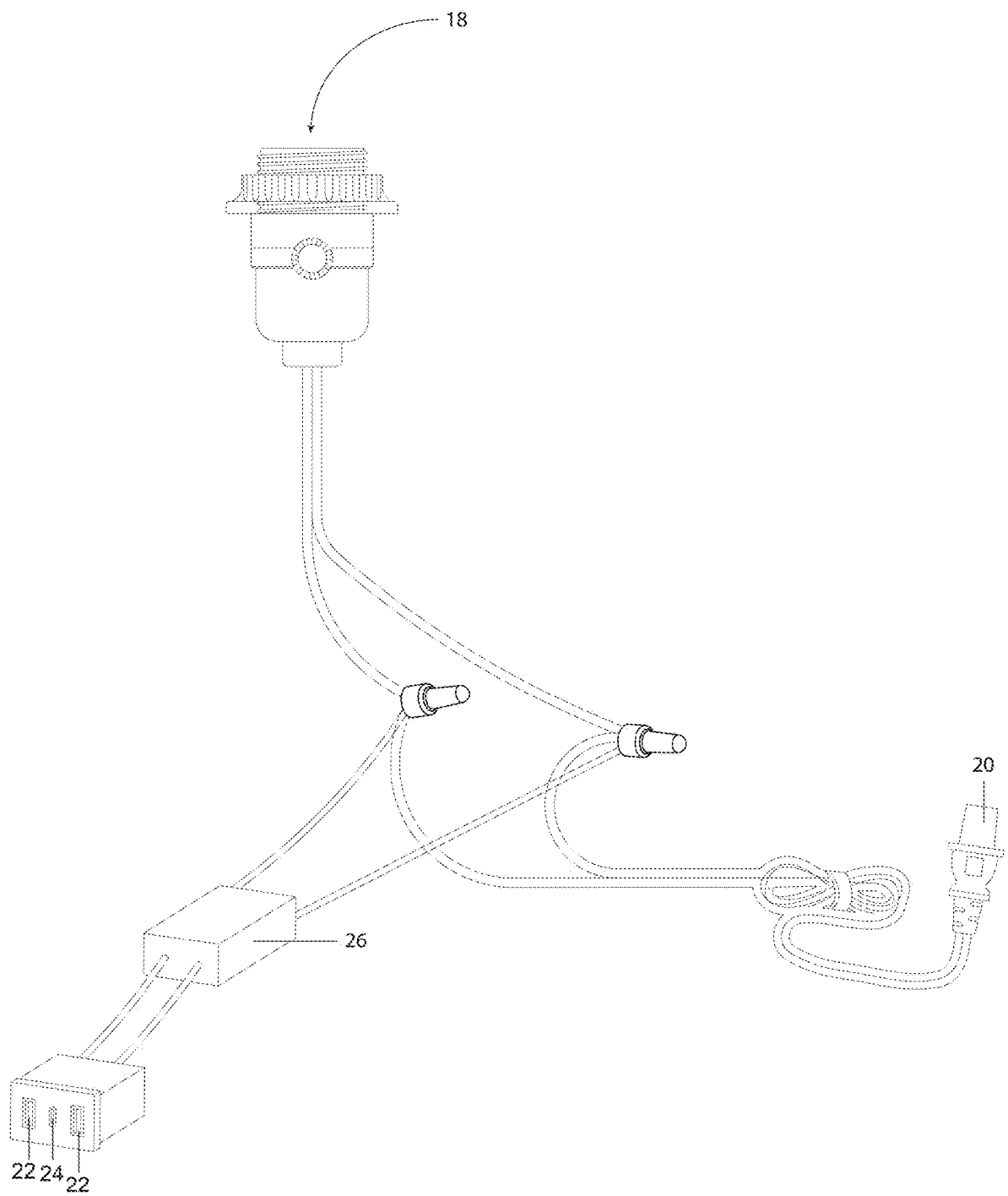
Figure 3A:
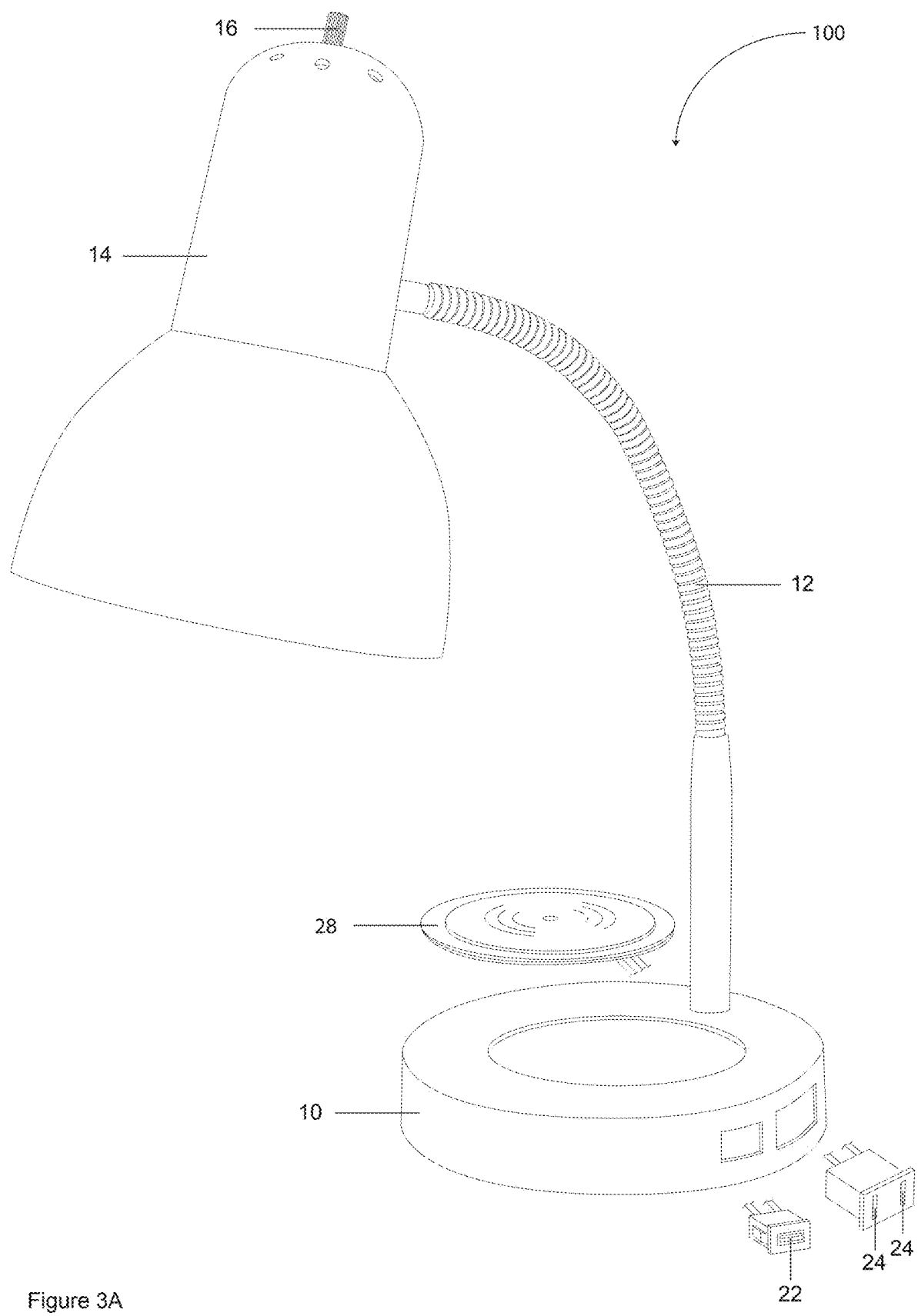
Figure 3B:
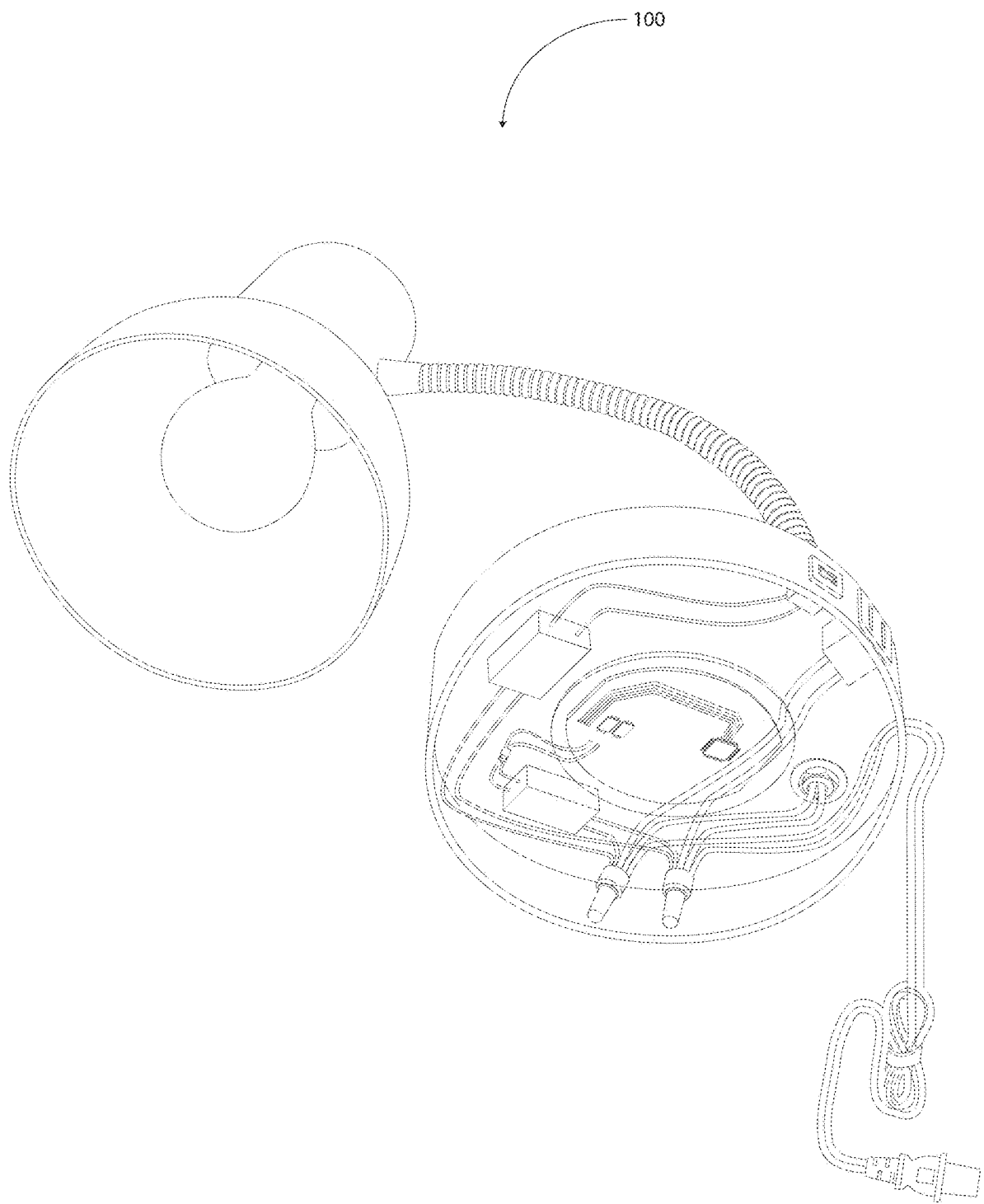
Figure 3C:
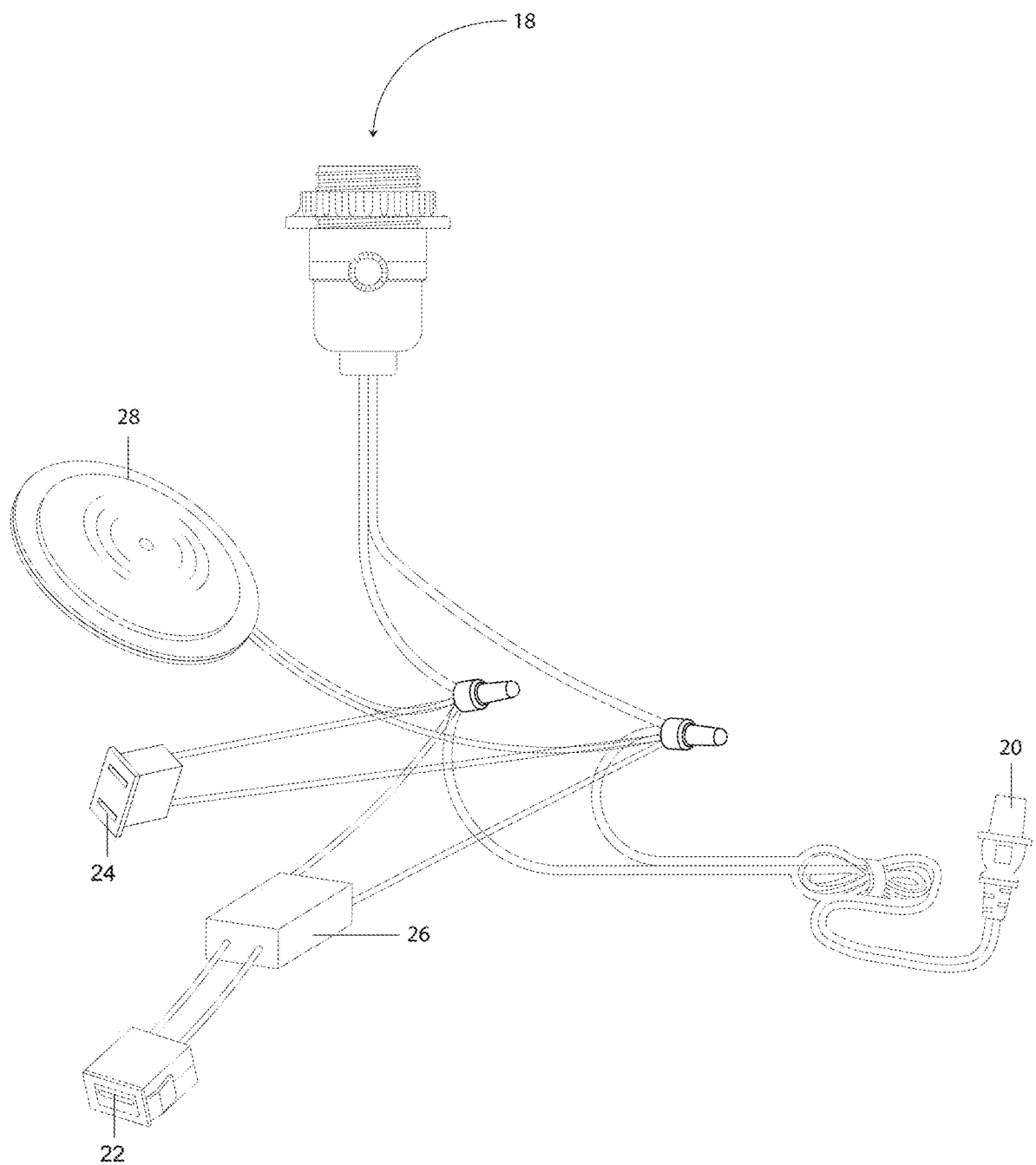
Figure 4A:
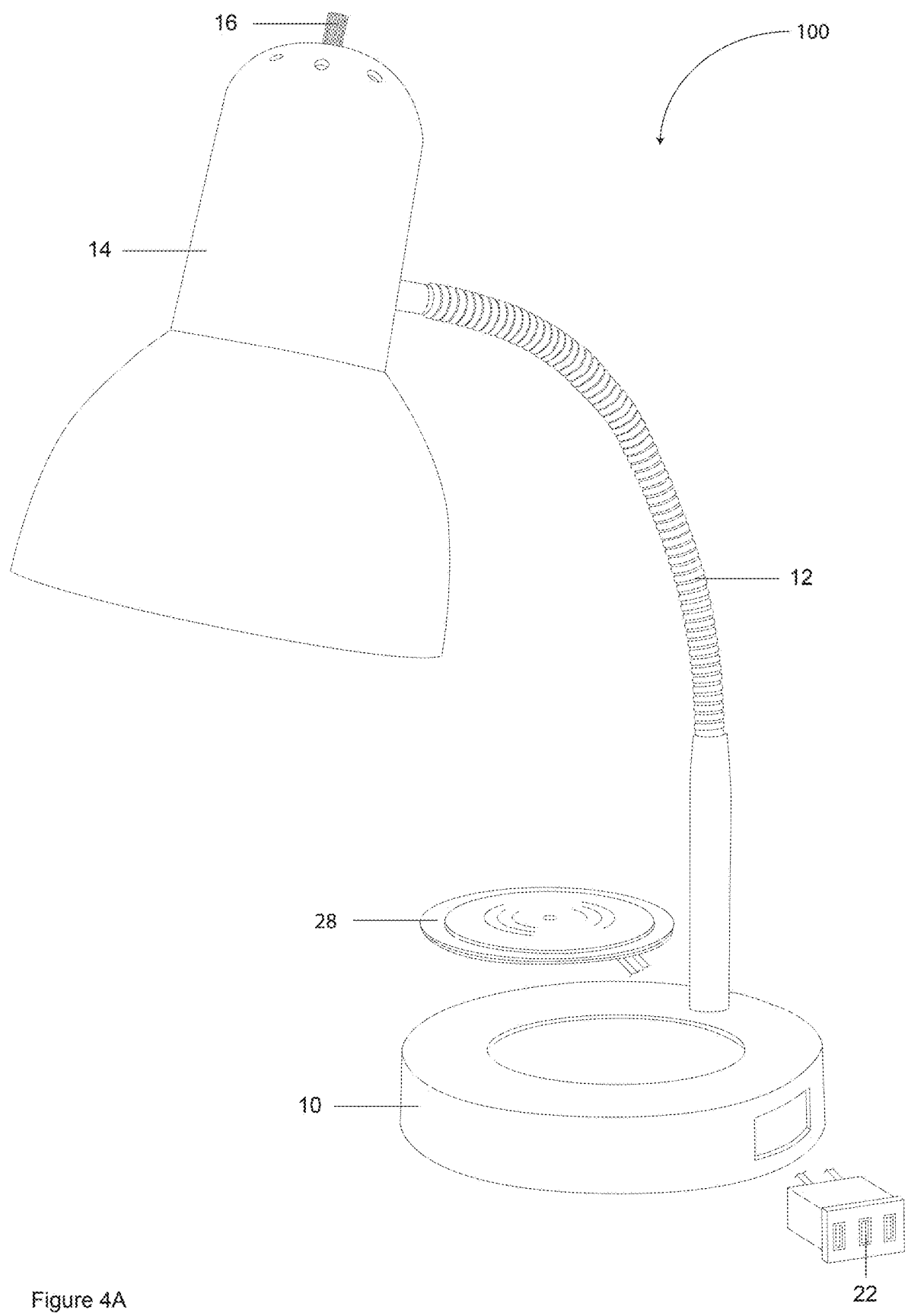
Figure 4B:
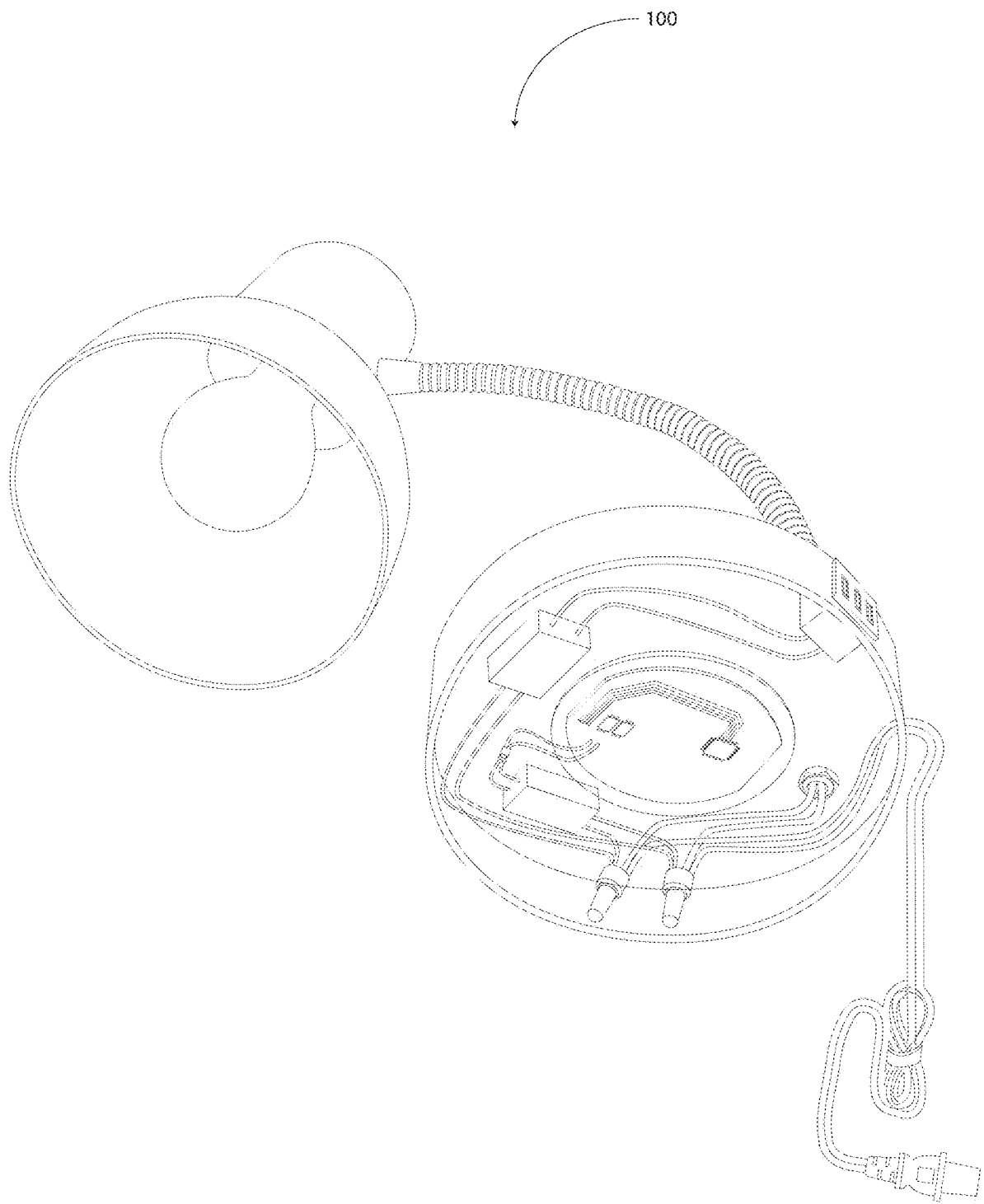
Figure 4C:
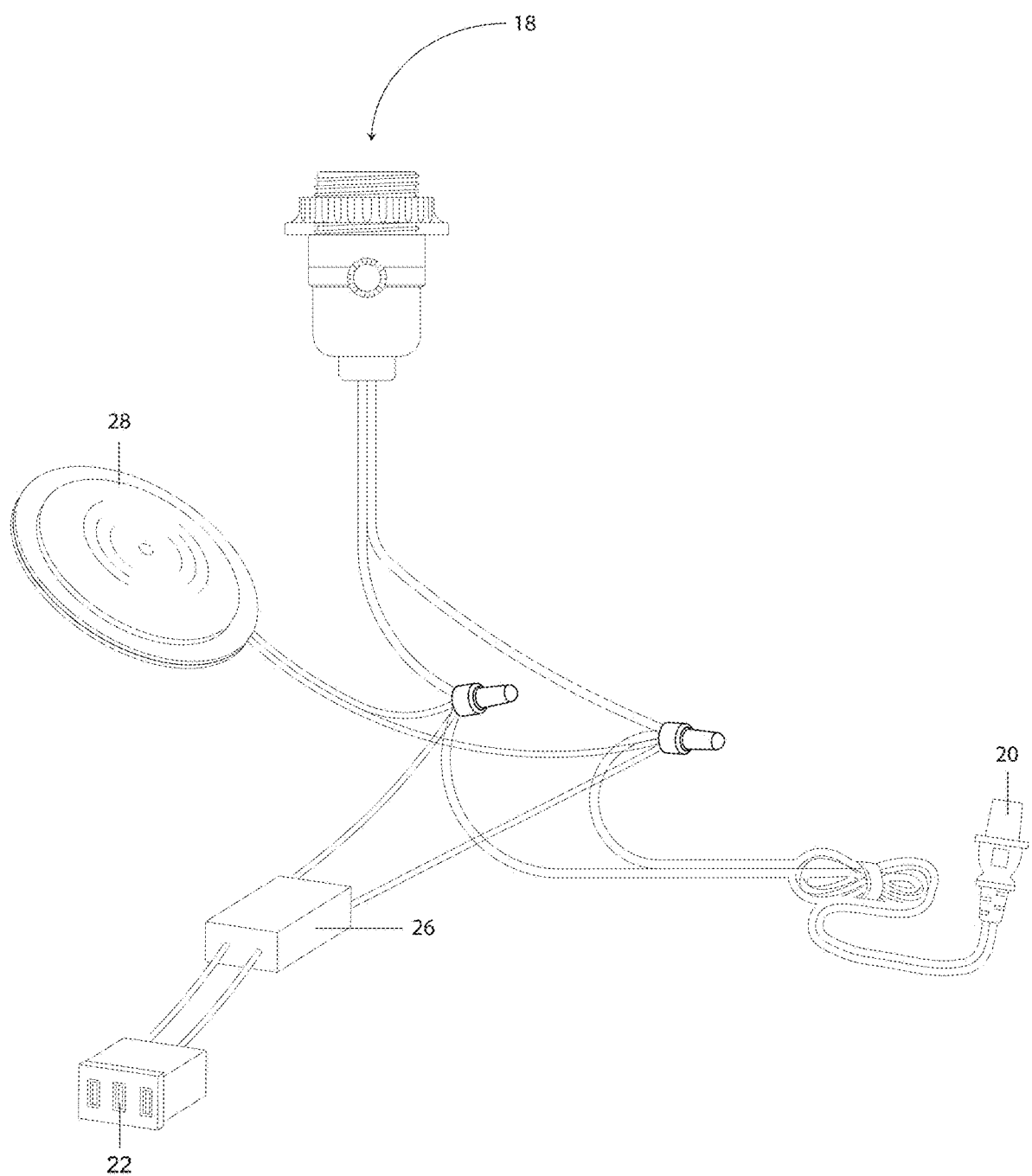
Figure 5:
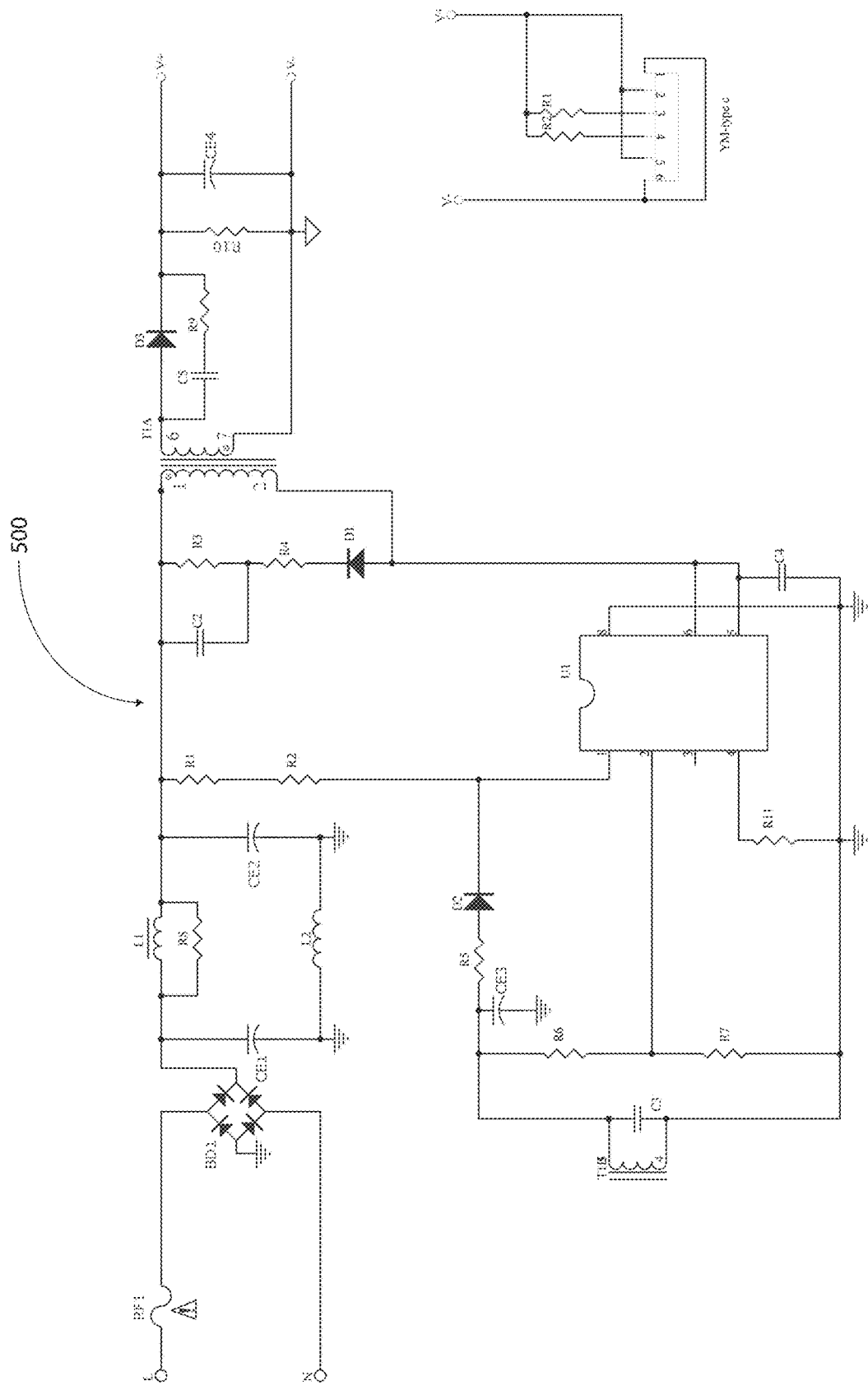
Figure 6:
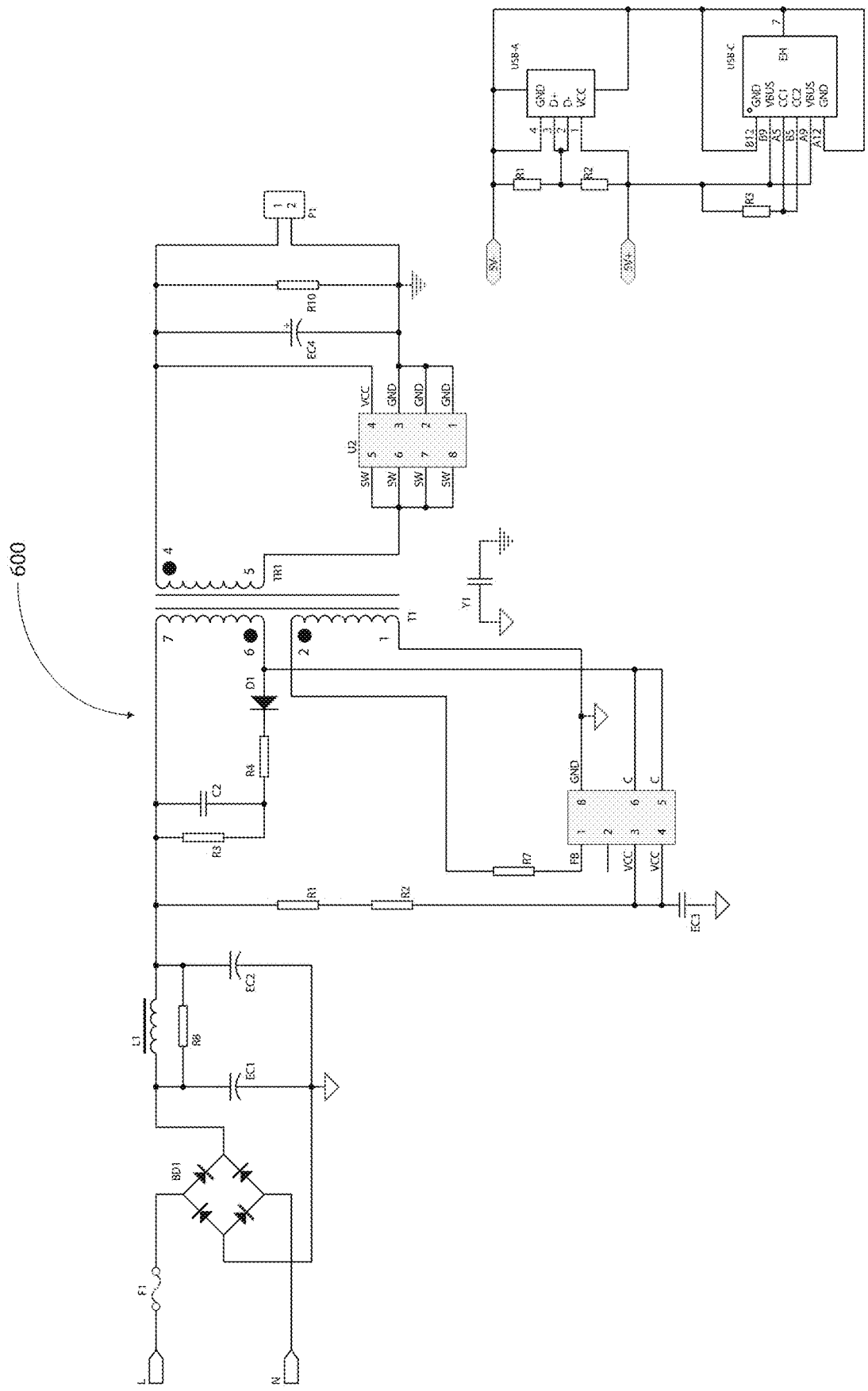
Figure 7:
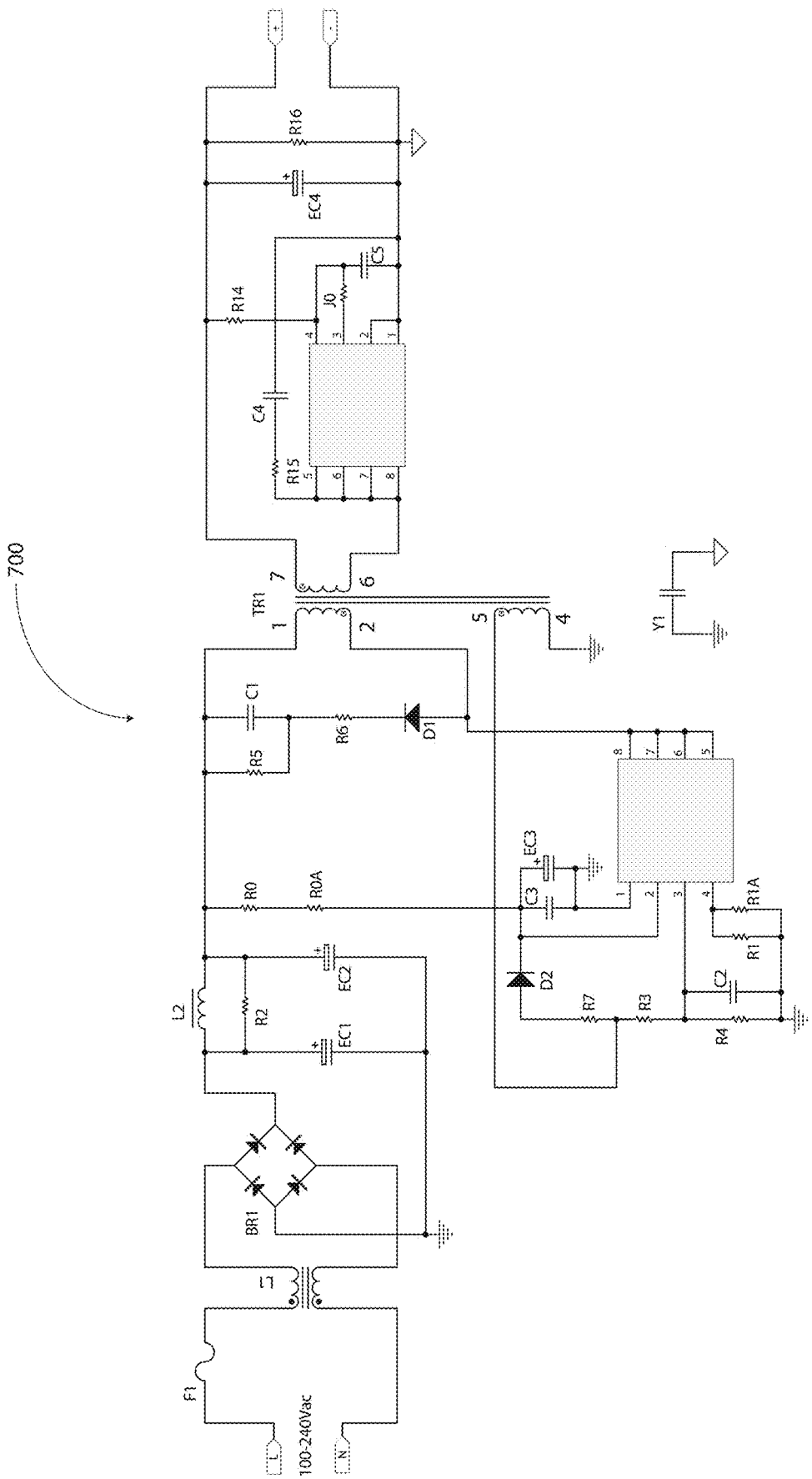
Figure 8:
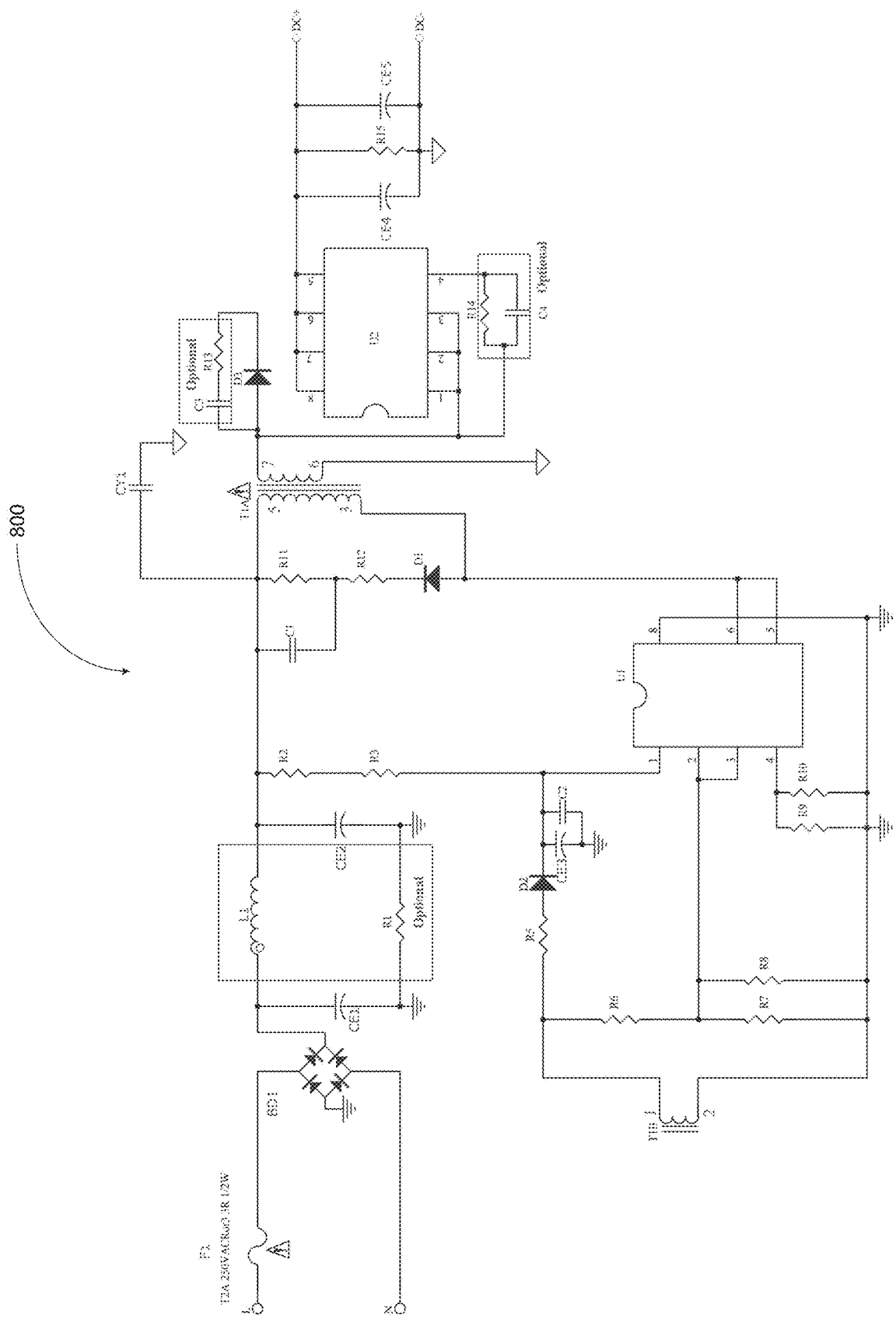

The invention will now be described with reference to the drawings wherein:

FIG. 1A of the drawings is an upper perspective view of a table lamp assembly of the present invention;

FIG. 1B of the drawings is a lower perspective view of the table lamp assembly of FIG. 1A;

FIG. 1C of the drawings is a perspective view of electrical components of the table lamp of FIG. 1A;

FIG. 2A of the drawings is an upper perspective view of a table lamp assembly of the present invention;

FIG. 2B of the drawings is a lower perspective view of the table lamp assembly of FIG. 2A;

FIG. 2C of the drawings is a perspective view of electrical components of the table lamp of FIG. 2A;

FIG. 3A of the drawings is an upper perspective view of a table lamp assembly of the present invention;

FIG. 3B of the drawings is a lower perspective view of the table lamp assembly of FIG. 3A;

FIG. 3C of the drawings is a perspective view of electrical components of the table lamp of FIG. 3A;

FIG. 4A of the drawings is an upper perspective view of a table lamp assembly of the present invention;

FIG. 4B of the drawings is a lower perspective view of the table lamp assembly of FIG. 4A;

FIG. 4C of the drawings is a perspective view of electrical components of the table lamp of FIG. 4A;

FIG. 5 of the drawings is an electrical circuit diagram for use with a table lamp assembly of the present invention;

FIG. 6 of the drawings is an electrical circuit diagram for use with a table lamp assembly of the present invention;

FIG. 7 of the drawings is an electrical circuit diagram for use with a table lamp assembly of the present invention; and FIG. 8 of the drawings is an electrical circuit diagram for use with a table lamp assembly of the present invention.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIGS. 1A-4C in particular, various configurations of table lamp 100 are shown as generally comprising: base structure 10 containing integrated electrical components therein, articulating arm 12, bulb housing/shade 14, switch 16 (on/off/optional dimmer); at least one light source 18 (i.e., incandescent bulb, line voltage Edison bulb, etcetera) connected to the base for illumination via AC power 20; one or more USB charging ports embedded within the base, including at least one USB Type-A port 22 and/or one USB Type-C port 24, configured to deliver direct current (DC) power to external electronic devices; controller, driver, rectifier, and/or transformer 26; and an optional wireless charging module 28 positioned on/within the base, configured for inductive charging of compatible electronic devices.

Preferably, (1) the power source connects to the primary power input of the circuit; (2) the on/off switch connects to the main power line to control the entire circuit's power. This switch preferably controls whether the lamp, dimmer, and USB ports are active. Alternatively, the USB and wireless charger may stay powered even when the light is off; (3) the dimmer is installed after the switch for controlling the incandescent bulb's brightness. It is preferably connected in series with the bulb to adjust the power level reaching it; (4) the incandescent bulb/Edison bulb connects to the dimmer, allowing the dimmer to control its brightness and ensure the bulb's voltage and wattage are compatible with the circuit; the USB-A and USB-C Ports, the USB power supply circuit preferably connects parallel to the main power line, ideally through a step-down converter to provide a stable 5V output for both USB ports. This converter preferably ensures the correct voltage for charging devices; and (5) the connection to USB Ports—The output from the step-down converter connects directly to both USB-A and USB-C ports, providing consistent power regardless of the dimmer's setting for the bulb. The same is true for the wireless charger.

In a preferred embodiment of the present invention, the USB Type-C port supports fast-charging protocols, enabling power delivery at multiple voltage levels according to device requirements.

In another preferred embodiment of the present invention, the table lamp further comprises an overcharge protection system configured to automatically halt charging for any connected device once the device's battery reaches full capacity, thereby preventing overcharging and extending the battery life of the device.

In yet another preferred embodiment of the present invention, the table lamp further comprises a rectification circuit configured to convert incoming alternating current (AC) from a main power source to direct current (DC) output for use in the USB charging ports and wireless charging module. In this embodiment, the rectification circuit includes a voltage regulation module, which maintains a consistent DC output by adjusting output voltage based on input fluctuations, thus ensuring stable charging for connected devices.

In one preferred embodiment of the present invention, the table lamp further comprises a thermal protection system with integrated temperature sensors configured to monitor the operating temperature within the charging module, wherein the system reduces or halts power output when a preset temperature threshold is reached.

In a preferred implementation of the present invention, the wireless charging module is configured according to the Qi standard and provides inductive power transfer compatible with a range of smartphones, tablets, and wearable devices.

In another preferred implementation of the present invention, the voltage regulation module comprises a feedback loop mechanism that continuously monitors the output voltage and adjusts it to maintain a fixed DC output of 5 volts at the USB Type-A port and a variable DC output of up to 20 volts at the USB Type-C port, according to the connected device's requirements.

In yet another preferred implementation of the present invention, the overcharge protection system includes a microcontroller that independently monitors the charging status of each connected USB port, halting power delivery at the precise moment a device reaches 100% charge and resuming only when the device's battery level falls below 95%. In this embodiment, an integrated circuit, such as a TP4056 (commercially available from Addicore) is utilized, which has built-in charging control, or a microcontroller programmed to stop the current flow once the phone battery is fully charged.

Referring now to FIG. 5 of the drawings, electrical circuit diagram 500 is shown. This circuit is suitable for use in a table lamp of the present invention. The components for this circuit and their function are provided hereinbelow:

Resistors
R1, R2, R3, R4, R5, R6, R7, R8, R9, R10, R11: These resistors are used to limit current, adjust voltage levels, and help maintain stable operation across various parts of the circuit.
Capacitors
CE1, CE2, CE3, CE4: These are input filtering capacitors, used to smooth out any ripples or fluctuations in voltage after the AC-to-DC conversion.
C2, C3, C4, C5: Additional capacitors used to stabilize and filter the DC voltage output, ensuring it remains steady for USB charging requirements.
Diodes
D1, D2, D3: These diodes allow current to flow in only one direction, aiding in the rectification process and protecting components from potential backflow of current.
Bridge Rectifier
BD1: Converts AC input to DC, creating the initial DC voltage that other components further regulate and smooth.
Fuse
RF1: Protects the circuit by disconnecting if the current exceeds a safe threshold, preventing potential damage to the circuit or connected devices.
Inductors
L1, L2: These inductors help filter and smooth the current, reducing any high-frequency noise or voltage spikes that may disrupt the operation of the USB charger.
Transistors
T1A, T1B: These act as switches or regulators to control the flow and stability of voltage, ensuring a steady 5V output suitable for USB charging.
Voltage Output Lines
V+ and V−: These represent the positive and negative voltage lines for the DC output.
USB-C Connector
YM-type C: The USB-C output port where devices connect for charging, providing a 5V, 1 A DC current.
Circuit Explanation
The circuit begins by drawing AC power from a wall outlet. This AC input first passes through a fuse (RF1), which is a critical safety component. If the current flowing through the circuit exceeds safe levels, the fuse will break the connection, protecting the lamp and any connected USB devices from damage due to overloads.

After passing through the fuse, the alternating current (AC) moves to the bridge rectifier (BD1). The bridge rectifier is composed of multiple diodes arranged to convert the AC input into a pulsating direct current (DC). This step is important because USB devices require DC power, while household outlets provide AC power.

Once the AC has been converted to pulsating DC, the current is smoothed out by a set of input filtering capacitors (CE1, CE2, CE3, and CE4). These capacitors temporarily store and release energy, filling in the gaps in the pulsating DC and reducing voltage fluctuations. This creates a more stable and cleaner DC current, but there may still be some small ripples or noise.

To further refine the output, inductors (L1 and L2) are introduced. Inductors store energy in a magnetic field when current flows through them, and they resist sudden changes in current. This helps filter out any remaining high-frequency noise and smooths the current flow, ensuring that sensitive devices connected to the USB port are not affected by voltage spikes or irregularities.

Next, the refined DC current is routed through the voltage regulation circuit, which includes transistors (T1A and T1B), and resistors (R1-R11). The transistors act as switches and regulators, carefully controlling the flow of current and maintaining a steady output voltage of 5V. The resistors play supporting roles by setting biasing conditions for the transistors and controlling the current to avoid overloading the circuit. Together, these components create a regulated 5V DC output that meets the standard USB charging requirements.

The final, stabilized 5V DC output is then directed to the USB-C connector (YM-type C), which provides a convenient charging interface for devices. This port is designed to deliver up to 1 A of current, which is a typical charging current for USB devices. By integrating this circuit into the lamp, users can charge their devices directly from the lamp, making it a multifunctional fixture. The careful design of this circuit ensures safe, steady, and noise-free charging, protecting both the lamp's internal components and the USB-charged devices.

Overall, this design provides both lighting and a reliable power source, making it a versatile addition to any desk or bedside setup.

In one embodiment of the present invention, a GaN (Gallium Nitride) transistor is used in place of the traditional silicon transistors (T1A and T1B). Unlike silicon transistors, which can lose energy as heat, GaN transistors operate with minimal resistance and heat loss, making them significantly more energy-efficient. This efficiency reduces the power waste, which not only enhances the safety of the lamp but also extends the life of all connected components.

With a GaN transistor, the circuit can deliver the 5V USB output more effectively, with quicker response times to any fluctuations in current demand from connected devices. Additionally, the compact nature of GaN transistors allows the entire circuit to be smaller and cooler, giving the lamp a sleek, modern edge.

Referring now to FIG. 6 of the drawings, electrical circuit diagram 600 is shown. This circuit is suitable for use in a table lamp of the present invention. The components for this circuit and their function are provided hereinbelow:

Bridge Rectifier (BD1):
Converts AC (alternating current) to DC (direct current), providing the necessary DC voltage needed for USB charging.

Resistors:
R1, R2, R3, R4, R7, R8, R10: Control and limit current flow across various parts of the circuit. These resistors help set voltages in certain sections, protect sensitive components from excessive current, and ensure stable operation throughout the circuit.

Capacitors:
EC1, EC2, EC3, EC4, C2: Act as filters and storage devices. These capacitors smooth out fluctuations in the rectified DC voltage by temporarily storing and releasing charge. This filtering action reduces voltage ripples, providing a more stable DC output.

Inductor (L1):
Filters out high-frequency noise in the current, helping to create a cleaner, more stable DC output. This is essential for USB charging, as it prevents potential interference and protects the charging device.

Diode (D1):
Ensures current flows in only one direction, further stabilizing the DC output and protecting the circuit against potential backflow of current, which could damage components.

Fuse (F1):
Acts as an overcurrent protection device. If the current exceeds a safe threshold, the fuse will break the connection, protecting both the circuit and any connected USB devices from damage.

Transformer (TR1):
Steps down the high AC voltage from the power source to a lower AC voltage suitable for rectification and regulation to 5V DC, making it safe for USB charging.

Switching Controller (U2):
This component, a key part of the voltage regulation process, includes several pins:
VCC: Provides power to the controller itself.
FB (Feedback): Monitors the output voltage and adjusts the regulation to maintain a steady 5V.
GND (Ground): Provides a common reference point for the circuit.
SW (Switching): Manages the switching frequency, controlling the flow of current to achieve the desired output voltage.

USB Connectors:
USB-A and USB-C Ports: These are the output ports that supply the regulated 5V DC to charge connected devices. They are configured to provide 2 A of current, allowing for fast charging capabilities.

Ground Reference (Y1):
Provides a stable ground point, essential for consistent operation of the circuit, helping to balance and stabilize voltages.

Circuit Explanation

In a table lamp with this integrated USB charger, the circuit transforms standard AC power from a wall outlet into a stable 5V DC output, ready for charging USB devices. The process begins as AC current flows through a fuse (F1), a safety feature that disconnects the circuit if the current exceeds safe levels, preventing damage to both the lamp and connected devices. The bridge rectifier (BD1) then converts the AC current to DC, but this initial DC output has fluctuations or ripples that need to be smoothed out for safe charging. A set of capacitors (EC1, EC2, EC3, EC4, C2) helps in this smoothing process, storing and releasing charge to reduce voltage fluctuations. Inductor L1 further filters the current, removing high-frequency noise and stabilizing it to ensure smooth output. The switching controller (U2) then precisely regulates the voltage to a consistent 5V through feedback mechanisms, adjusting as needed to maintain a steady output. The regulated DC power is then directed to both the USB-A and USB-C output ports, which supply up to 2 A, providing fast and efficient charging for various devices. This circuit allows the table lamp to serve as both a light source and a reliable charging station, combining convenience with safety and functionality.

Referring now to FIG. 7 of the drawings, electrical circuit diagram 700 is shown. This circuit is suitable for use in a table lamp of the present invention. The components for this circuit and their function are provided hereinbelow:

Bridge Rectifier (BR1):
Converts AC input to DC, allowing the lamp's AC power source to be transformed into the necessary DC voltage for USB charging.

Transformer (TR1):
Steps down the high AC input voltage (100-240V) to a lower AC voltage, making it safe and manageable for the conversion to a 5V DC output.

Fuse (F1):
Protects the circuit by breaking the connection in case of an overcurrent, safeguarding both the lamp's electronics and any connected USB devices.

Inductors:

L1, L2: These inductors act as filters, smoothing out any high-frequency noise and ensuring stable DC output suitable for USB charging.

Diodes:

D1, D2: Ensure current flows in one direction only, supporting the rectification process and protecting components from reverse current.

Resistors:

R0, R0A, R1, R1A, R2, R3, R4, R5, R6, R7, R15, R16: These resistors regulate current throughout the circuit, limit excessive current, and support various stages of voltage adjustment.

Capacitors:

EC1, EC2, EC3, EC4, C1, C2, C3, C4, C5: These capacitors are responsible for smoothing the DC output by storing and releasing charge as needed, reducing voltage fluctuations and providing a stable output.

Ground Reference (Y1):

Acts as a common reference point for the entire circuit, helping to stabilize voltages.

USB Output (J0):

Provides a 5V, 3 A output, suitable for charging high-power USB devices.

Circuit Explanation

AC to DC Conversion and Initial Safety: The circuit begins by receiving standard household AC power, typically between 100-240V. This AC current first passes through a fuse (F1), designed to protect the circuit by breaking the connection if the current exceeds a safe limit. After passing through the fuse, the high-voltage AC power enters the transformer (TR1), which steps it down to a lower AC voltage, making it more suitable for rectification and regulation.

Rectification Process: The stepped-down AC voltage is then directed to the bridge rectifier (BR1), where it is converted into a pulsating DC current. This rectification step is important, as USB ports require direct current (DC) rather than the alternating current (AC) provided by wall outlets.

Smoothing the DC Current: The pulsating DC output from the bridge rectifier is not yet stable enough for USB charging, as it still contains fluctuations or ripples. Here, a set of capacitors (EC1, EC2, EC3, EC4, C1, C2, C3, C4, C5) steps in to smooth these fluctuations. Capacitors store energy during peaks in the DC signal and release it during dips, creating a more stable and consistent DC output.

Noise Filtering: To ensure the DC output is as stable as possible, inductors (L1, L2) are added to the circuit. These inductors filter out high-frequency noise, which can interfere with sensitive electronics. By resisting rapid changes in current, the inductors help maintain a clean and consistent power supply, protecting USB-connected devices from interference and voltage spikes.

Voltage Regulation and Current Control: The circuit includes a variety of resistors (R0, R0A, R1, R1A, R2, R3, R4, R5, R6, R7, R15, R16), which play critical roles in controlling the current and ensuring a precise 5V output. These resistors limit excessive current, regulate voltage drops, and help maintain the stable 3A output needed for USB charging. The precise arrangement of resistors ensures that each stage of the circuit operates within safe limits, providing consistent power without risking overcurrent.

Output Stabilization and Delivery: The stabilized 5V DC output is directed to the USB port (J0), configured to deliver up to 3 A. This high-current output is suitable for fast-charging devices, making it versatile for charging more power-demanding gadgets such as tablets and smartphones.

In summary, this circuit provides a safe, stable, and high-current USB output by converting AC power to a clean 5V, 3 A DC output. It integrates into the table lamp to serve as both a reliable light source and a convenient charging station, offering functionality and protection for a range of connected devices.

Referring now to FIG. 8 of the drawings, electrical circuit diagram 800 is shown. This circuit is suitable for use in a table lamp of the present invention. The components for this circuit and their function are provided hereinbelow:

Bridge Rectifier (BD1):

Converts AC (alternating current) input to DC (direct current), a necessary step since both USB and wireless charging require DC power.

Fuse (F1):

Protects the circuit by breaking the connection if there is an overcurrent, providing a safety barrier for the lamp and connected devices.

Inductor (L1):

Reduces high-frequency noise, filtering the current and helping maintain stable DC output for USB and wireless charging.

Diodes:

D1, D2, D3: Ensure that current flows in a single direction and provide protection against any reverse current that could damage components.

Capacitors:

CE1, CE2, CE3, CE4, CE5, C1, C2, C3, C4: These capacitors smooth the DC output, filtering out voltage fluctuations to ensure stable operation for both USB and wireless charging.

Resistors:

R1, R2, R3, R5, R6, R7, R8, R9, R10, R11, R12, R13, R14, R15: These resistors help regulate current flow, control voltage levels across various parts of the circuit, and protect components from excessive current.

Ground Reference Capacitor (CY1):

Acts as a safety component to ground any potential noise, further stabilizing the output for wireless and USB charging.

Transistors (T1A, T1B):

Act as switches or regulators within the circuit, helping to control the flow of current for consistent 5V output.

Controller IC (U1, U2):

Controls and stabilizes the output voltage, maintaining the 5V DC necessary for charging. It may also manage the switch between USB and wireless charging, ensuring both outputs receive consistent power.

DC Output Terminals (DC+ and DC−):

Deliver the final, stable DC output to the USB port and the wireless charging coil, providing power for both charging methods.

Circuit Explanation

Initial AC to DC Conversion: The circuit starts by receiving AC power from a standard wall outlet, typically 120-240V. This AC current is first routed through fuse (F1), which provides overcurrent protection, preventing damage in case of sudden surges. The AC current is then converted to DC through the bridge rectifier (BD1). This component, arranged with diodes, allows the AC to be transformed into a pulsating DC, a necessary first step before voltage smoothing.

Smoothing and Noise Reduction: Once converted, the DC output still contains ripples. To smooth these fluctuations, capacitors (CE1, CE2, CE3, CE4, CE5) temporarily store and release energy, leveling out the peaks and troughs in the DC signal. Additionally, inductor (L1) works to filter any high-frequency noise, further stabilizing the DC output to ensure that the USB and wireless charging systems receive clean, consistent power.

Regulation and Control of Output Voltage: After smoothing, the DC current flows through transistors (T1A, T1B) and the controller ICs (U1, U2). The transistors act as regulators, adjusting the current flow, while the controller IC monitors and adjusts the voltage to maintain a stable 5V output. This control stage ensures that both the USB port and the wireless charging coil can receive a steady 5V output, suitable for powering devices without risking overcurrent.

Safety and Grounding: Ground reference capacitor (CY1) is included to capture any stray noise and ensure that the circuit maintains a stable reference point. This step is essential for wireless charging, as it helps prevent interference that could disrupt the wireless charging process.

Output Delivery for USB and Wireless Charging: The stabilized 5V DC output is routed to the DC output terminals (DC+ and DC−), where it is split to serve both the USB port and the wireless charging coil. The USB port provides a physical charging option at 5V and 2 A, ideal for a wide range of devices. Simultaneously, the 5V output directed to the wireless charging coil enables the table lamp to provide Qi-compatible wireless charging, allowing devices to charge simply by being placed on the lamp's designated charging area.

In summary, this dual-purpose circuit allows the table lamp to serve as both a USB charging station and a wireless charger. By converting, smoothing, and stabilizing AC power to a consistent 5V DC, it ensures safe, efficient, and flexible charging options integrated within the lamp's design. This setup is perfect for modern use, offering seamless charging for multiple devices through both wired and wireless methods.

In a preferred embodiment of the present invention, the table lamp includes a smart charging management system or circuit functionality with adaptive power allocation. In this embodiment, the circuit automatically detects the number and type of devices connected (USB and wireless) and dynamically allocates power between them. For example, if both USB and wireless charging are in use, the circuit can prioritize the faster-charging USB port unless it detects a low-power wireless device. This helps to ensure that power-hungry devices receive the optimal charge while still allowing simultaneous use of both charging methods. In this embodiment, the circuit can utilize device recognition and optimization by incorporating a microcontroller that recognizes specific device types and adjusts the charging parameters (voltage and current levels) accordingly. This approach can provide optimal charging for various devices, from low-power wearables to high-capacity tablets, while reducing power waste.

In accordance with the present invention, the table lamps preferably include over-the-air firmware update capability. With the rapid evolution of charging standards (such as USB Power Delivery (PD) or Quick Charge), over-the-air (OTA) firmware update capabilities are important. With this implementation, users can update their table lamp via Bluetooth or a dedicated app, ensuring compatibility with new device charging standards as they emerge.

In another preferred embodiment of the present invention, the table lamps include integrated temperature sensors near the wireless charging coil and USB ports. These sensors monitor the temperature in real-time, preventing overheating by adjusting the charging current. For example, if the temperature rises above a certain threshold, the system could reduce charging speed temporarily, then automatically resume full power once the temperature stabilizes.

In yet another preferred embodiment of the present invention, the table lamps include multiple wireless charging coils: Instead of a single coil, a multi-coil array is used so that devices can charge regardless of their exact placement on the charging pad. This multi-coil configuration eliminates the need for precise alignment, making it easier for users to place their devices and still receive consistent charging.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A table lamp, comprising:
   a base structure containing electrical components;
   at least one light source connected to the base for illumination;
   at least one USB Type-A port or one USB Type-C port, provided in the base and configured to deliver direct current (DC) power to external electronic devices;
   a wireless charging module positioned in the base, and configured for inductive charging of compatible electronic devices;
   a rectification circuit configured to convert incoming alternating current (AC) from a main power source to direct current (DC) output for use in the USB charging ports and wireless charging module, wherein the rectification circuit includes a voltage regulation module configured to maintain a consistent DC output, wherein the voltage regulation module comprises a feedback loop mechanism that continuously monitors the output voltage and adjusts it to maintain a fixed DC output of 5 volts at the USB Type-A port and a variable DC output of up to 20 volts at the USB Type-C port.

2. The table lamp according to claim 1, wherein the USB Type-C port supports fast-charging protocols, enabling power delivery at multiple voltage levels according to device requirements.

3. The table lamp according to claim 1, further comprising a thermal protection system having temperature sensors configured to monitor the operating temperature within the charging module, the system configured to reduce or halt a reduces or halts power output when a preset temperature threshold is reached.

4. The table lamp according to claim 1, wherein the wireless charging module is configured according to the Qi 2.0 standard to provide inductive power transfer compatible with a range of smartphones, tablets, and wearable devices.

5. The table lamp according to claim 1, further comprising a dedicated surface area provided in the base for the wireless charging module, allowing users to place a device on the base for immediate charging without requiring a physical connection.

6. The table lamp according to claim 1, further comprising:
   an overcharge protection system configured to automatically halt charging for any connected device once the device's battery reaches full capacity, thereby preventing overcharging and extending the battery life of the device.

7. The table lamp according to claim 6, wherein the overcharge protection system includes a microcontroller that independently monitors the charging status of each connected USB port, halting power delivery at the precise moment a device reaches 100% charge and resuming only when the device's battery level falls below 95%.

8. A table lamp, comprising:
   a base having a dedicated surface area;
   a lighting circuit housed in the base, and having a light source for providing illumination;
   a multi-port charging system;
   a USB charging assembly within the base, including at least one USB Type-A ports and one USB Type-C port, each port connected to a rectification circuit configured to convert alternating current (AC) from a main power supply to a stable direct current (DC) output for device charging;
   a wireless charging module integrated into the dedicated surface area, and configured for inductive power transfer to Qi2-compatible devices, wherein the module includes a power control unit that automatically adjusts charging speed based on device proximity and battery status;
   an overcharge protection system electrically coupled to both the USB charging assembly and the wireless charging module, and configured to sense individual battery levels of connected devices and independently discontinue power flow upon detecting full charge to prevent battery degradation;
   a thermal management system including temperature sensors embedded in each charging port and in the wireless charging module; and
   a microcontroller connected to the temperature sensors and configured for dynamically controlling power output to maintain safe operating temperatures and prevent overheating.

9. A multi-functional table lamp with an integrated charging system, comprising:
   a base structure;
      a light fixture supported by the base structure, the light fixture including an incandescent bulb;
   a lighting circuit within the base configured to power the incandescent bulb;
   a multiple USB ports including at least one USB Type-C port specifically configured with power delivery (PD) support, allowing adjustable voltage output up to 20 volts DC and providing up to 60 watts of power for high-capacity devices, wherein each USB port includes both a rectification and a voltage regulation circuit, configured to adjust the output to match the charging requirements of each connected device;
   a wireless charging module including a wireless charging surface;
   an intelligent control system integrated with the wireless charging module, configured to detect the presence and battery level of Qi2-compatible devices and to adjust inductive power transfer rates accordingly;
   an overcharge protection circuit for each USB and wireless module, which halts charging at 100% and resumes charging only if the device battery level drops below 95%, thereby reducing battery wear; and
   a modular safety system within the base structure, comprising short circuit, overvoltage, and thermal protection subsystems, each controlled by an onboard microcontroller that monitors and adjusts power flow, voltage stability, and temperature levels across all charging outputs to optimize safety for both the lamp and connected devices.

10. A multifunctional table lamp with integrated USB and wireless charging capabilities, comprising:

an illumination module;

an AC to DC converter circuit including a bridge rectifier and transformer, configured to convert alternating current from a household power source to a direct current output;

a charging control circuit with a plurality of capacitors and inductors, arranged to smooth and filter the direct current output from the AC to DC converter circuit;

a wireless charging coil and a USB output port, both connected to the charging control circuit and configured to provide simultaneous charging outputs for electronic devices, wherein the USB output port provides 5V DC at up to 2 A and the wireless charging coil provides 5V DC at up to 2 A;

a temperature monitoring system with one or more sensors positioned adjacent to the wireless charging coil and USB port, configured to detect temperature fluctuations during charging and adjust the charging current when a temperature threshold is exceeded;

an adaptive power allocation controller, integrated with the charging control circuit, capable of dynamically distributing power between the USB port and the wireless charging coil based on the detected power requirements of connected devices;

a user feedback display integrated into the lamp, configured to indicate charging status and alert the user if the temperature threshold is exceeded; and wherein the multifunctional table lamp allows simultaneous USB and wireless charging, maintains optimal temperature during operation, and dynamically adjusts power distribution for enhanced charging efficiency and device safety.

* * * * *